Oct. 23, 1956  A. E. JUVE ET AL  2,768,068
OZONE TEST ON RUBBER
Filed March 18, 1954  4 Sheets-Sheet 2

INVENTORS
ARTHUR E. JUVE
JAMES R. BEATTY
BY C. E. Tripp
ATTY

Oct. 23, 1956 A. E. JUVE ET AL 2,768,068
OZONE TEST ON RUBBER
Filed March 18, 1954 4 Sheets-Sheet 3
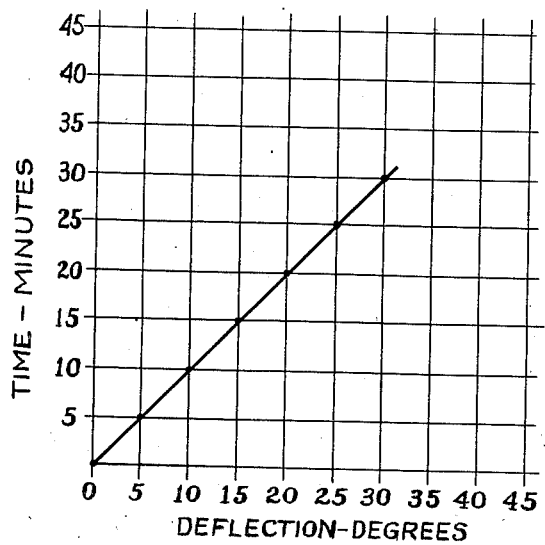
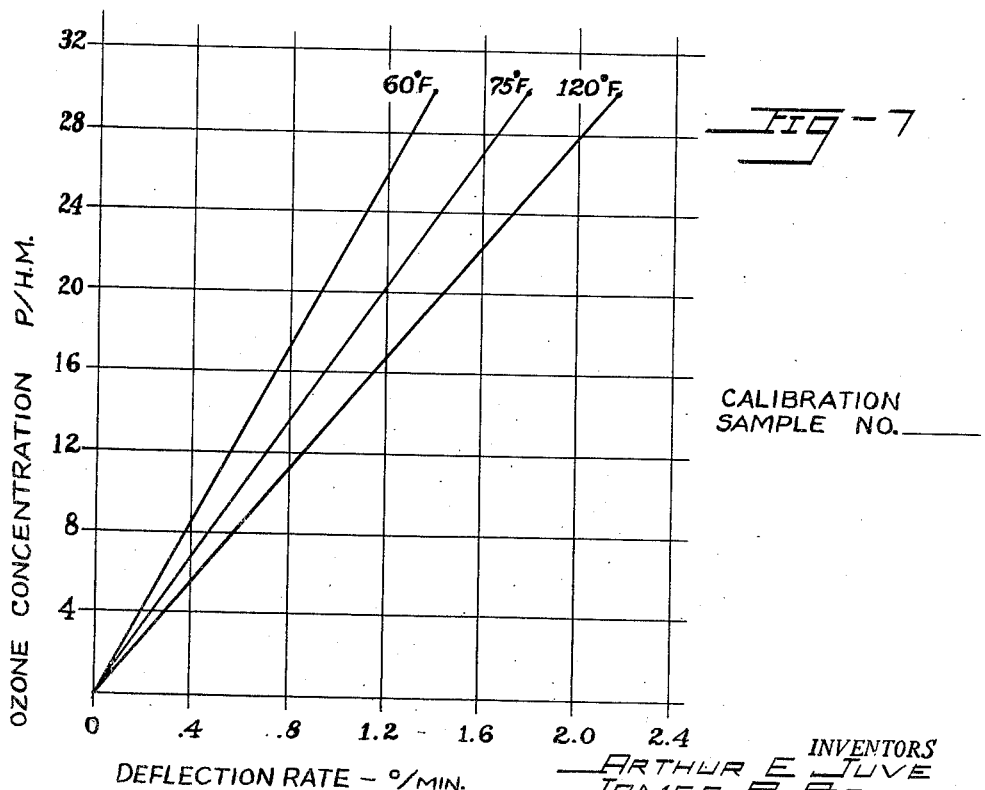
INVENTORS
ARTHUR E. JUVE
JAMES R. BEATTY
BY C. E. Tripp
ATTY

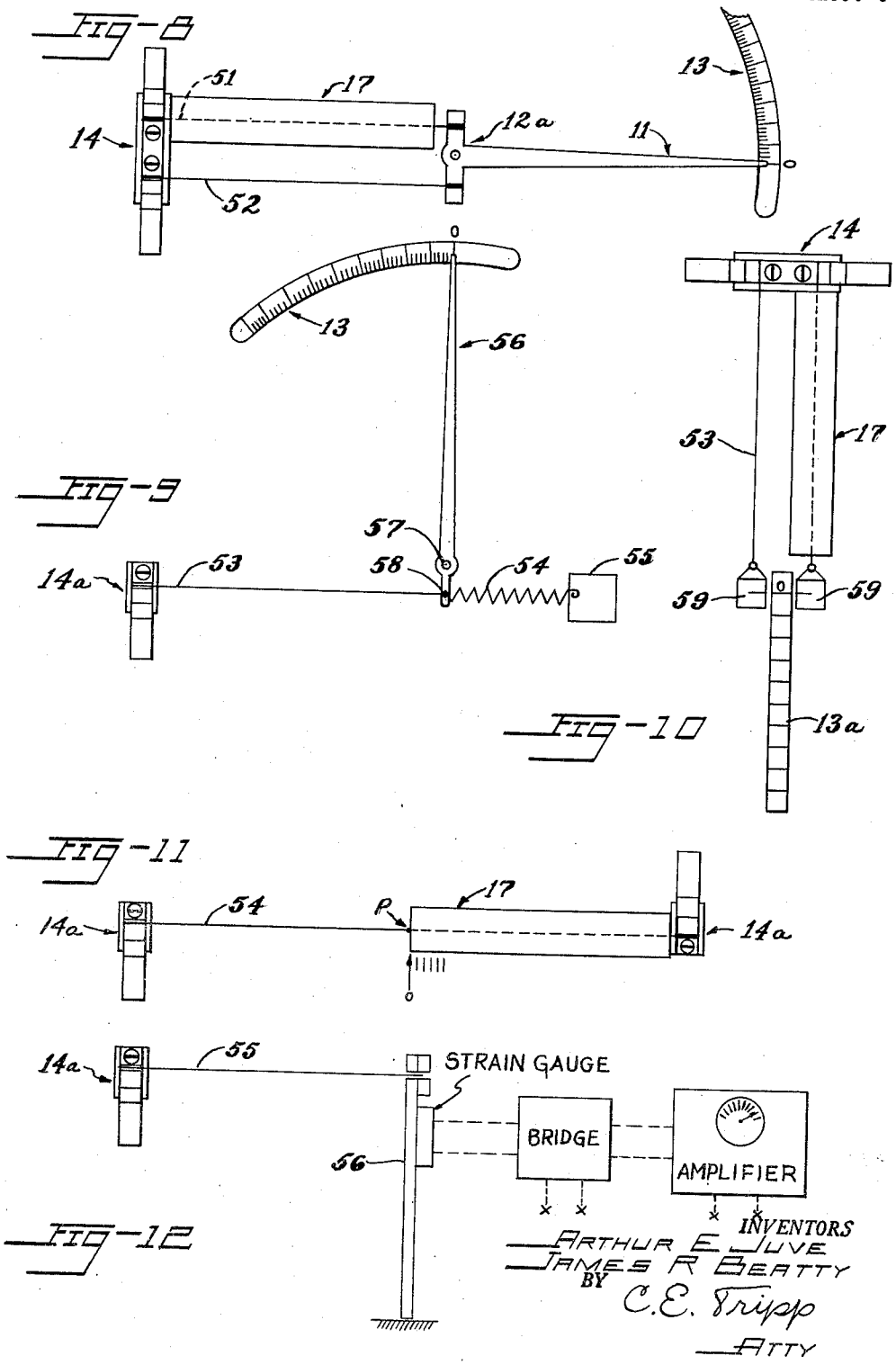

United States Patent Office 2,768,068
Patented Oct. 23, 1956

2,768,068

OZONE TEST ON RUBBER

Arthur E. Juve, Peninsula, and James R. Beatty, Akron, Ohio, assignors to The B. F. Goodrich Company, New York, N. Y., a corporation of New York Application March 18, 1954, Serial No. 417,016

5 Claims. (Cl. 23—230)

The method and apparatus of this device relates to three interdependent fields namely:

(1) The measurement of the concentration of ozone in the atmosphere, (2) The effect of the given ozone concentration on a sample of rubber, and (3) The comparative effects of ozone on various rubber samples all subjected to the same atmosphere at the same time.

With regard to the problem of determining the ozone concentration in the atmosphere before this invention such determination has presented various difficulties and has required highly skilled techniques. A system commonly used is referred to as the Crabtree-Kemp apparatus which is described in Industrial Engineering Chemistry, Anal. Edition (1951). This apparatus which depends upon the liberation of iodine from a solution of potassium iodide by agency of the ozone is bulky, non-portable, difficult to operate, and inaccurate at low ozone concentrations. Applicants' apparatus is, on the other hand, compact, light in weight, simple to manufacture, portable, can be operated at any altitude (as in an airplane, for example) without need for auxiliary equipment. The apparatus depends for its operation upon the effect of ozone on rubber under tension. It has long been known that both natural and most synthetic rubbers, when under tension, crack with surprising rapidity under ozone attack, even with the very small ozone concentrations normally occurring in our atmosphere. Attempts have been made to utilize this effect as a measurement of ozone concentration by observing the appearance of cracks in the rubber, but such methods are not only inaccurate, but are very subjective. We have found that no observations of the appearance of the rubber need be made, but the effect of ozone on rubber can be measured by measuring the stress relaxation during a period of time of a sample of rubber under tension while subject to ozone attack. In the preferred method and apparatus of our invention, we make this measurement while the rubber is at a constant strain or elongation so that the only variable is the relaxation of the rubber due to ozone cracking. Briefly, in the preferred embodiment of our invention, we make the aforesaid measurement by stretching a rubber band of predetermined length around a jeweled bearing pulley, holding the ends of the rubber by clamps so that parallel reaches or lengths are provided at each side of the pulley axis. The pointer is attached to the pulley and one of the parallel lengths is surrounded by ozone absorbing material such as blotting paper which rapidly evacuates the ozone from the adjacent rubber. Readings of the pointer position are taken from time to time and it will be found that over a period of no more than thirty minutes a marked relaxation will have occurred in the length exposed to the atmosphere whereupon a corresponding relaxation occurs in the protected length due to revolution of the pulley under differential forces. Rubber bands of known compounding may be calibrated with this device in known ozone concentrations after which an instrument mounting a new length of the same stock can be used as a very simple compact ozone concentration measuring instrument that can be transported from place to place. This device can also be used as means for comparing the effects of ozone on various rubber stocks and compounds by merely substituting for the standard rubber band one made up of the rubber under test. Several of these devices, each with a band having a different rubber compound can be placed in a test chamber or in the test atmosphere to give an exact comparison of the ozone effects on the various stocks. The device can be installed in an airplane or balloon and used to study variations in ozone concentration with altitude and it can be used by proper observation to determine variations in ozone concentration in the atmosphere from hour to hour or with the seasons or at different geographical locations. The results obtained from a calibrated device of this invention compare (within the limits of observational error) with the results obtained from the cumbersome and difficulty manipulated Crabtree-Kemp ozone analyser. The preferred apparatus inherently balances out the effects of creep, that is, relaxation of rubber under tension due to the passage of time alone.

The manner in which these advantages are obtained will be apparent from the following detailed description of the invention.

In the drawings:

Fig. 6 is a curve plotted during the test run to determine the rate of deflection of the pointer, and Fig. 7 is a family of curves employed to present the ozone concentration for a given compound at various temperatures.

Figs. 8–12 each show a modified form of the invention.

Construction of the apparatus

Figure 1:
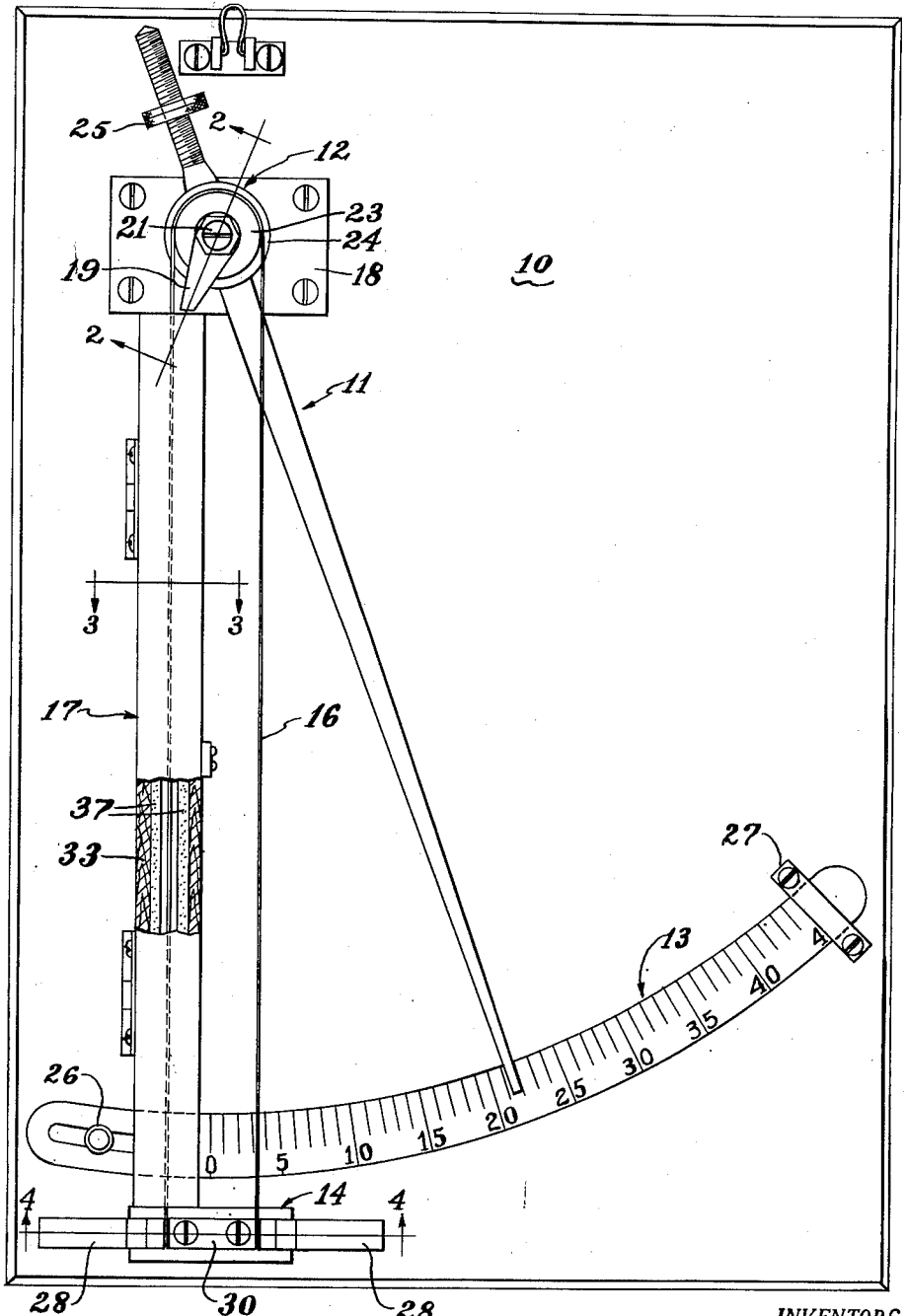
Fig. 1 is a plan view of a preferred form of the apparatus.
Figure 4:
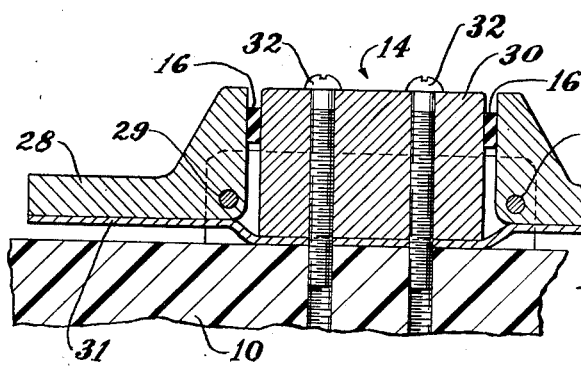
Fig. 4 is a section taken on 4—4 showing a suitable grip construction.

The apparatus 10 is mounted on a suitable base such as a wooden support. Basic components of the apparatus are: the indicating pointer 11 pivotally mounted on a pulley 12 running in jeweled bearings and reading against a degree scale 13; grips 14 that hold the ends of the rubber sample which passes around the pulley 12; and an ozone barrier box with one leg of the sample 16 being exposed to the atmosphere whereas the other leg is protected by the ozone barrier box 17. Referring to the pointer mounting assembly, plate 18 is suitably fastened to the base of the machine and attached to this plate, is a kerfed bearing block 19 which carries aligned jeweled bearing assemblies 21 and which receive the staff 22 that forms the hub of the pulley. The construction of the bearing assemblies is not critical to the invention. The pulley or drum 23 about which the test sample 16 passes, is notched to receive the pointer 11 and has screwed thereto a flange or plate 24 which assists in aligning the sample around the pulley. The pointer is counterbalanced by weight 25. The drum portion 23 is preferably made of a hard smooth material, the only important consideration being that the bearing are as friction free as possible. Referring to Fig. 1 the scale 13 is marked in degrees and is arcuate in section. One end is slotted and clamped by a clamp member 26, the other end rides freely through a saddle 27 so that the initial position of the scale can be adjusted within limits. A section through the grips appears in Fig. 4 wherein a pair of jaws 28 are pivoted at 29 to a block 30 attached to the base of the machine. Any resilient means such as spring 31 may be used to urge the jaws towards the block 30 to clamp the end of the sample 16. Screws 32 attach the grip assembly to the machine base.

Figure 3:
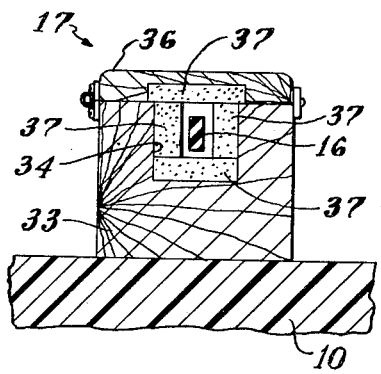
Fig. 3 is a section taken on 3—3 of Fig. 1 through the ozone barrier box.

The barrier box 17 may be made of wood as seen in Fig. 3 and has a body portion 33 formed with a slot 34 closed by a hinged lid 36. Strips of blotting paper 37 are arranged as seen in Fig. 3 so as to surround the length of sample 16. Ozone is present in most atmospheres in such low concentrations that its partial pressure is extremely small. It has been found that cellulose materials such as blotting paper or the like "soak up" the ozone in an area enclosed thereby so that within all measurable limits, the space through which the sample 16 passes within the blotting paper sheet is rendered free of ozone.

Use of the apparatus

Figure 5:
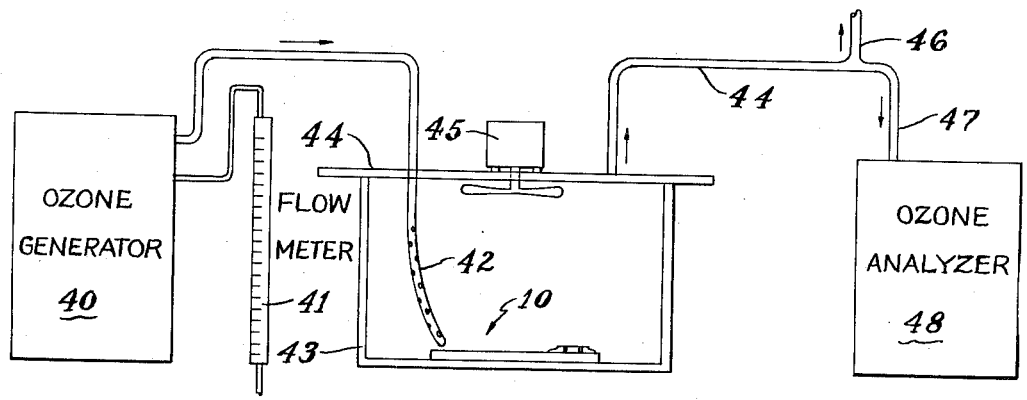
Fig. 5 is a diagram of the calibration apparatus.
Figure 2:
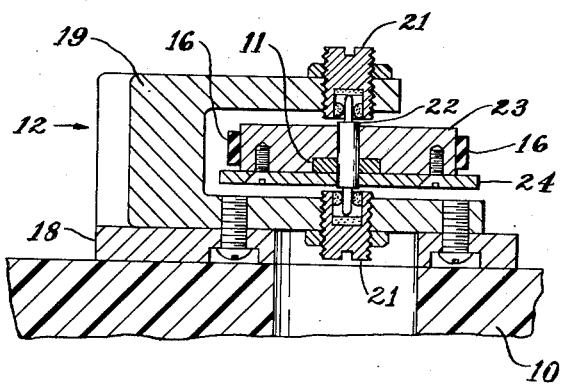
Fig. 2 is a section taken on 2—2 of Fig. 1.

The specimen (which is a rubber band of known composition, such as golf ball rubber or the like) is cut to a length roughly equal to the distance between the grips and the pulley so that by maintaining specimen lengths standard, tests will always be at a given percent elongation of the specimen. This is required because studies made with the instrument have indicated that there is a substantial change in the effect of a given ozone concentration as the percent elongation of the specimen changes, and since the ozone effect is high at 100% elongation, the use of this elongation permits acceleration of the tests. The rubber band is placed in the grips and passed around the pulley. The tension on the two legs is equalized by running a pin or pencil around the flange of the pulley towards the tight side as indicated by the initial position of the pointer. The pulley need not be brought to zero scale and fine adjustments can be made by the manipulation of the scale clamp 26. After the zero setting is established, the pointer is deflected to 45° by hand to remove any irregularities that might exist around the circumference of the pulley. When the test is started, the temperature of the surrounding air is noted and depending upon the accuracy desired, the relative humidity may also be taken because it has been found that relative humidity has some effect upon the action of the ozone on the rubber. The lid of the barrier box is closed and the time of closing noted. This represents zero time on the deflection chart. Readings are taken at periodic intervals such as every five minutes. On taking a reading, the instrument or its container is tapped lightly to insure that static friction cannot introduce a differential strain in the two legs of the rubber under test. Ordinarily, a test run of thirty minutes is sufficient to obtain accurate results. On completion of the test, a curve is drawn as indicated in Fig. 6. It has been found from many test runs that within the time limits of the tests, the rate of deflection is substantially constant so that the curve in Fig. 6 may be closely approximated by a straight line. The slope of the curve of Fig. 6 represents the deflection rate, and may be used in several ways depending upon the purpose of the test. If it is merely used to compare the action of the ozone on the sample under test with the action of ozone on a standard sample or with other samples, nothing further need be done. However, as mentioned previously, this apparatus may also be employed to directly measure ozone concentration in the atmosphere surrounding the apparatus. In order to do this, of course, the apparatus must be calibrated with a sample of known composition in the grips, and this may be accomplished by the test set-up shown diagrammatically in Fig. 5.

Calibration procedure

The ozone generator 40 is a box containing a number of sterilizing lamps which serve as sources of ozone. The ozone concentration can be adjusted by switching in and out a desired number of lamps and by adjusting the rate of flow of air through the system by observing the flow meter 41. The use of laboratory compressed air, piped to the input of the flow meter, has the advantage that the pipes and pressure apparatus absorbs substantially all the ozone from the air supply. The ozonized air leaves the generator and is discharged through a distribution pipe 42 extending into a glass container 43. The container, which may have a volume of one meter, has a glass lid 44 which rests on the container with a ground fit and which may be sealed against leakage of air around the lid by the use of silicone grease or the like. An agitator such as fan 45 is necessary because of the low partial pressure of ozone, and the fan insures that the ozone concentration at the test specimen will remain the same as the concentration of the ozone-charged air. Of course, the ozone meter 10 is placed within the test chamber and the barrier box closed at the beginning of the test. The instrument is jarred or rapped during the test, as mentioned to assure accurate readings. The outlet of the test chamber is connected by pipe 44 to a flow divider which has one branch 46 open to atmosphere and another branch 47 that leads into the ozone analyzer 48. The need for the flow divider arises because it has been found desirable to pass more ozonized air over the specimen than can be handled by the Crabtree-Kemp ozone analyzer. The quantity of air passing over the apparatus during the test is of no significance. It is only important that enough air be passed over the instrument to insure uniform ozone distribution about the rubber band under test. We have found that a minimum flow rate of one cubic meter per hour of ozonized air in a test chamber of one cubic meter volume can give satisfactory results and secures the same action as would be obtained outdoors or in a large room. Test runs are made in a calibration process at various ozone concentrations as indicated by the Crabtree-Kemp analyzer. Similarly, since temperature affects the action of ozone on rubber a series of test runs were made at various temperatures. The result of these runs may be plotted as a family of curves as indicated in Fig. 7 with the deflection rate in degrees per minute plotted against ozone concentration in parts of ozone per hundred million parts of air. To use the calibration curve, a test specimen of the same compound with which calibration curve was made is subjected to the atmosphere of unknown ozone concentration and readings are taken on the machine. The deflection rate as determined from the readings of the machine is entered on the abscissa of the calibration curves such as those of Fig. 7, and the ozone concentration will be found from the ordinate reading on the proper temperature line.

In order to make certain that the effects be measured solely for ozone, tests were run with the test apparatus wherein the instrument was bathed in other gases such as oxygen, nitrogen and laboratory compressed air. No deflections of the pointer were observed in any case so it can be concluded that the action is due almost entirely to the ozone present either in the use of an ozone generator in case of calibration or in the atmosphere in case of other types of tests. It is to be noted that the small portion of the rubber specimen that extends between the grip and the barrier box 17 and between the box and the pulley has no effect on the readings. That is because each of the aforesaid lengths has its mate on the opposite leg so that the effects on the unexposed lengths are cancelled out. The fact that the instrument is insensitive to creep can be readily ascertained by merely leaving the lid of the barrier box open and watching the pointer. No pointer motion occurs over a long period of time. Tests have shown that once the minimum rate of one cubic meter of ozonized air per hour is reached, an increase in rates of air passed over the instrument has no effect on the readings. This is also borne out by the fact that tests have proven that where the readings are taken outdoors, a wind velocity has little effect on the readings. Not only do the readings of the instrument agree with those obtained from the Crabtree-Kemp analyzer but it is believed that since the instrument acts directly and leaves nothing to chance elements, its results might be fully as, if not more, accurate than those heretofore determined by chemical means.

In conclusion, it can be seen that this device has many uses in addition to its function of measuring unknown ozone concentrations. Also, its measurement of the variations of ozone concentrations from time to time and place to place and at various altitudes likewise permits comparing the effect of ozone on various test samples as compared to a standard sample. Obviously, the device provides ready means for comparing the effect of ozone on any number of samples under inspection. The effect of compounding on resistance to ozone attacks is readily investigated by this apparatus. It is not known how small the device can be made for laboratory type results. It is known that the device of the dimensions indicated, wherein the test sample in its relaxed condition is in the order of nine inches long, provides highly accurate results. It is entirely possible that the device can be greatly reduced in size. At this time the device is so compact that no need for reducing the size of it has arisen.

In the modification shown in Fig. 8 the specimen is in two lengths 51 and 52, and instead of a pulley, a balance lever 12a retains one end of each length. The test procedure is like that previously described except initial mounting of the specimen is somewhat more tedious.

In the form of Fig. 9, the test specimen 53 is balanced against a spring 54, fixed at 55. A pointer 56, pivoted at 57 connects to the junction of the band and the spring at 58. This machine will not correct for creep, but in view of the previous disclosure its mode of operation will be apparent. As the band 53 relaxes under ozone attack, spring 54 contracts and moves the pointer.

In Fig. 10, the specimen 53, instead of being stretched by a spring is stretched by a weight 59 reading against a scale 13a. A companion specimen can be covered by box 17 if desired to eliminate effects due to creep.

The device of Fig. 11 is fundamentally like the preferred form except that the pulley is omitted. The specimen 54 is marked at point P, and at the end of the test the shift in point P is noted. Since P will enter the barrier box 17, unless the latter is transparent at the point P, it is most convenient to take a single reading at the end of the test and assume that the relaxation rate is a straight line through the origin in a chart such as that of Fig. 6.

The apparatus of Fig. 12 resembles that of Fig. 9 except that the specimen 55 is clamped to a cantilever spring 56. Change in tension or relaxation of the specimen is then measured by a resistance type strain gauge connected to a bridge and to an amplifier as is well known in the measuring and testing arts. Of course, a covered length of rubber could be added to cancel creep as in Figs. 8 and 11, if desired.

This completes a detailed description that will enable those skilled in the art to practice our invention.

We claim:

1. The method of measuring the effect of ozone attack on rubber comprising the steps of gripping a length of rubber band at one end and applying a tension load to the other end of said length of rubber band sufficient to stretch the said length of rubber band by a predetermined initial percent elongation, exposing said length to ozone attack for a predetermined time, permitting said other end of said length to move while maintaining the applied tension on said length substantially constant as ozone attack causes progressive weakening of said length, and measuring the motion of said other end during said predetermined time of exposure.

2. The method of measuring the effect of ozone attack on rubber comprising the steps of tensioning a length of rubber band to a known percent elongation, subjecting said length to ozone attack, and measuring the relaxation of a portion of said length during a given period of time while said length is under the ozone attack.

3. The method of measuring the effect of ozone attack on rubber comprising the steps of opposing the tension force of an ozone-protected length of a rubber band with the tension force of an ozone exposed length, and measuring the relaxation of said exposed length of rubber band during a given period of time while said exposed length is under ozone attack.

4. Apparatus for measuring the effect of ozone attack on rubber comprising a freely rotatable pulley, a pair of adjacent grips spaced from the pulley axis for gripping the ends of a length of rubber band that passes around said pulley, an elongated band enclosure extending between one of said grips and the periphery of the pulley, ozone absorbing material in said enclosure and arranged to provide a through opening for free passage of said band, and means to measure displacement of said pulley as a result of ozone attack on the un-enclosed length of rubber band.

5. The method of measuring ozone concentration in an atmosphere of unknown concentration comprising the steps of selecting a rubber band from a supply of stock of known compound, gripping a length of said rubber band at one end and applying a tension load to the other end of said length sufficient to stretch the band by a predetermined initial percent elongation, exposing said length to ozone attack for a predetermined time in an ozone atmosphere of known concentration, permitting said other end of said length to move while maintaining the applied tension on said length substantially constant as ozone attack causes progressive weakening of said length, and measuring the motion of a selected portion of said band during said predetermined time of exposure; selecting another rubber band from the same stock, repeating the steps defined above in the atmosphere of unknown ozone concentration; and comparing the results to find the unknown ozone concentration.

References Cited in the file of this patent
UNITED STATES PATENTS

| | | |
|---|---|---|
| 2,641,128 | Black | June 9, 1953 |
| 2,645,564 | Tiffany | July 14, 1953 |
| 2,709,359 | Koch et al. | May 31, 1955 |

OTHER REFERENCES

Crabtree et al.: "Ind. and Eng. Chem. Anal. Ed.," vol. 18, December 1946, pages 769–774.

Bradley et al.: "Rubber Chem. and Technol.," vol. 24, 1951, pages 750–755.

Creed et al.: "India Rubber World," vol. 126, April 1952, page 90.